United States Patent [19]
Pabreza

[11] 3,885,764
[45] May 27, 1975

[54] SEAT PEDESTAL
[75] Inventor: Robert M. Pabreza, Jackson, Mich.
[73] Assignee: Excel Industries, Incorporated, Elkhart, Ind.
[22] Filed: July 25, 1973
[21] Appl. No.: 382,329

[52] U.S. Cl. .............. 248/162; 248/157; 248/415; 297/345
[51] Int. Cl. ............................................ F16m 11/28
[58] Field of Search .......... 248/162, 161, 157, 418, 248/402, 415, 416, 401, 225; 16/86 A, 52, 66; 297/344, 345

[56] References Cited
UNITED STATES PATENTS

| 645,057 | 3/1900 | Ayers et al | 248/18 |
| 1,455,584 | 5/1923 | Graham | 16/66 X |
| 1,782,660 | 11/1930 | Meyer | 248/162 |
| 2,490,125 | 12/1949 | Greppin | 248/162 |
| 3,025,631 | 3/1962 | Reynolds | 248/188.9 |
| 3,765,638 | 10/1973 | Harrison | 248/225 X |

FOREIGN PATENTS OR APPLICATIONS

| 585,605 | 2/1947 | United Kingdom | 248/161 |
| 54,287 | 11/1889 | Germany | 248/161 |
| 700,480 | 12/1953 | United Kingdom | 248/161 |

Primary Examiner—Roy D. Frazier
Assistant Examiner—Robert W. Gibson, Jr.
Attorney, Agent, or Firm—Whittemore, Hulbert & Belknap

[57] ABSTRACT

A seat pedestal is provided for use in vehicles such as motor homes. The pedestal includes telescoping elements which form an adjustable vertical support column. A single elastomeric block is provided within the tubular elements for simultaneously locking the elements together in adjusted vertical and angular positions and to simultaneously release the tubular elements for adjustment vertically and angularly.

3 Claims, 5 Drawing Figures

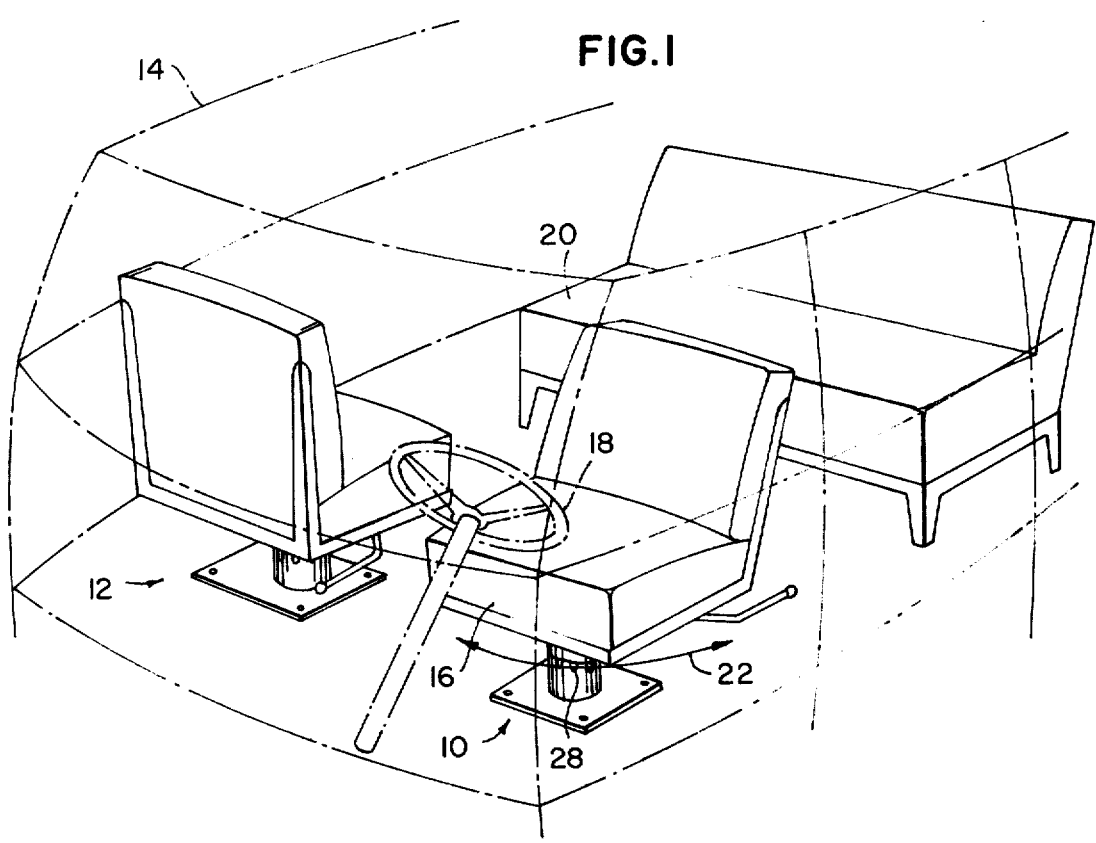
FIG. 1
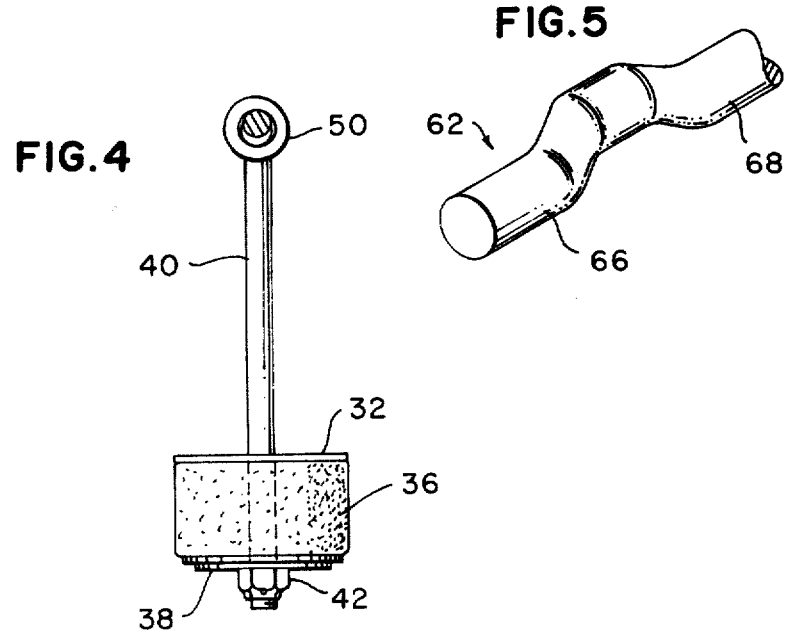
FIG. 4
FIG. 5

PATENTED MAY 27 1975 3,885,764
SHEET 2

SEAT PEDESTAL

BACKGROUND OF THE INVENTION

While the present invention is not restricted to use in motor homes, it is particularly suited for use in such an environment. A motor homes as currently defined is a large van-type vehicle which has been converted interiorly to define a living area such as formerly associated with travel trailers. A motor home differs from a travel trailer in that a travel trailer must be pulled by a separate vehicle whereas in a motor home the motivating power is integral therewith.

As in all such recreational vehicles, space is at a premium and it is desirable to utilize all available space at maximum efficiency. One common technique in designing such recreational vehicles is to provide dual use of space for different purposes. For example, table structures are commonly convertible into beds, and couches also are commonly convertible into beds. In the motor home situation, it is desired to utilize the forward compartment of the vehicle for a standard driving situation but to make the forward portion convertible into a small living room-like area when the vehicle is not being driven.

Conventionally, a pair of pedestals are provided side by side in the forward portion of the motor home for a driver and a passenger. It is desired that such pedestals be vertically adjustable to suit different sized persons and also that they be able to swivel so that they may be turned in a direction facing the rearward portion of the motor vehicle when the motor vehicle is not being driven. The pedestals thereby form chair structures defining part of the living room-like area.

One problem which has been encountered in the past in connection with adjustability of such pedestals is that it has been necessary to provide oke adjusting mechanism permitting vertical adjustment of the pedestal and a second adjusting mechanism permitting swiveling of the pedestal. In accordance with the present invention, a single adjusting mechanism is provided which will lock a pedestal in an adjusted vertical position and at the same time in an adjusted angular position. This not only simplifies adjustment of the pedestal but tends to reduce the cost of the pedestal by eliminating one adjusting mechanism.

SUMMARY OF THE INVENTION

A seat pedestal is provided with an upstanding first tubular element and a second tubular element telescopingly received therein for support of a seat. An elastomeric block is provided within the first tubular element. The block is out of engagement with the inner surface of the first tubular element when the block is in the relaxed state. The block is secured to the second tubular element for movement therewith. Actuator means are provided to compress the block in the direction of the longitudinal axis of the first tubular element with consequent radially outward expansion of the block to frictionally engage the inner surface of the first tubular element and releasably secure the tubular elements together to prevent relative movement thereof. The actuator means is operable to release the block to permit relaxation thereof and thereby permit simultaneous vertical and rotative adjustment of the second tubular element with respect to the first tubular element.

IN THE DRAWINGS

FIG. 1 is a view in perspective of the forward compartment of a motor home illustrating installation of the seat pedestal of the present invention in an exemplary environment;

FIG. 4 is an elevational view of the member utilized to lock the seat pedestal in an adjusted position; and FIG. 5 is a view in perspective of cam structure utilized to actuate the locking mechanism of the seat pedestal.

Figure 2:
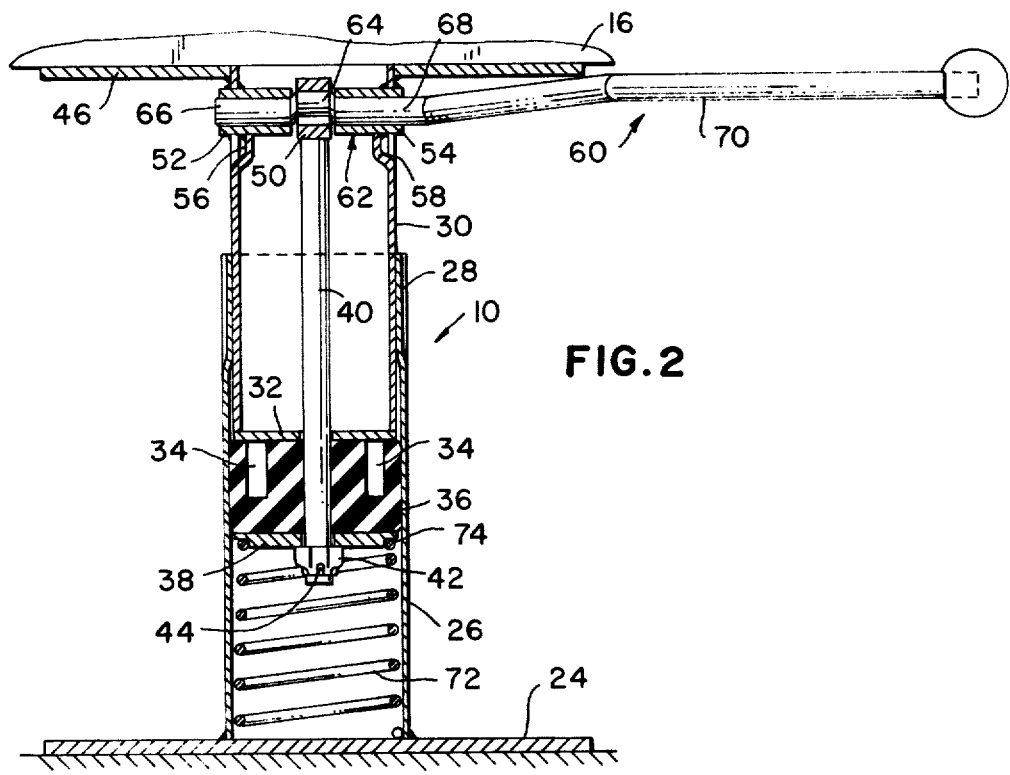
FIG. 2 is an elevational view in section of one embodiment of the seat pedestal of the present invention in the locked condition.

Referring to FIG. 1, it will be noted that a pair of seat pedestals 10, 12 are illustrated as being mounted in the forward compartment of a motor home 14. One seat pedestal 10 is positioned so that the seat 16 which it supports faces the steering wheel 18 of the motor home permitting the motor home to be driven. The seat pedestal 12 is illustratively turned rearwardly whereby the occupant thereof may converse with people sitting on the couch structure 20. Such motor homes have a compartment to the rear of the couch structure 20 which normally includes a cooking area, sleeping area and the like.

In practice, the seat pedestal 12 would not be turned rearwardly while the vehicle is being driven. However, the seat pedestal structure of the present invention permits such rearward turning of both seat pedestals 10, 12 to thereby convert the forward compartment of the motor home into a small living room as indicated by arrow 22.

The structure of the seat pedestal 10 is illustrated in FIGS. 2, 3, 4 and 5. As will be noted, the seat pedestal 10 comprises a base plate 24 which is bolted to the vehicle floor as shown in FIG. 1. An upright tubular element 26 is secured to the plate 24 as by welding. The upper portion of the element 26 has formed therein a plurality of spaced apart ribs 28. These ribs act as a bearing surface for sliding reception of upper tubular element 30 which is telescopingly received within tubular element 26. The ribs 28 also increase the strength of the upper portion of tubular element 26. The ribs 28 further act as a stop structure to prevent separation of the tubular elements.

A plate 32 is secured to the lower end of tubular element 30 as by welding. The diameter of plate 32 is less than the inner diameter of the lower portion of tubular element 26 but greater than the diameter defined by the ribs 28 so that plate 32 will permit movement of the tubular element 30 but will abut against the ribs 28 to prevent separation of the tubular elements as above-mentioned.

A plurality of downwardly extending pins 34 are provided on the under side of plate 32. The pins 34 extend into a cylindrical elastomeric element 36. The element 36 functions as a locking and unlocking device. When compressed, element 36 frictionally engages the inner surface of the tubular element 26 to prevent both up and down movement of the element 30 and rotation of element 30 within the element 26. The pins 34 function to fasten the cylindrical element 36 to the plate 32.

Figure 3:
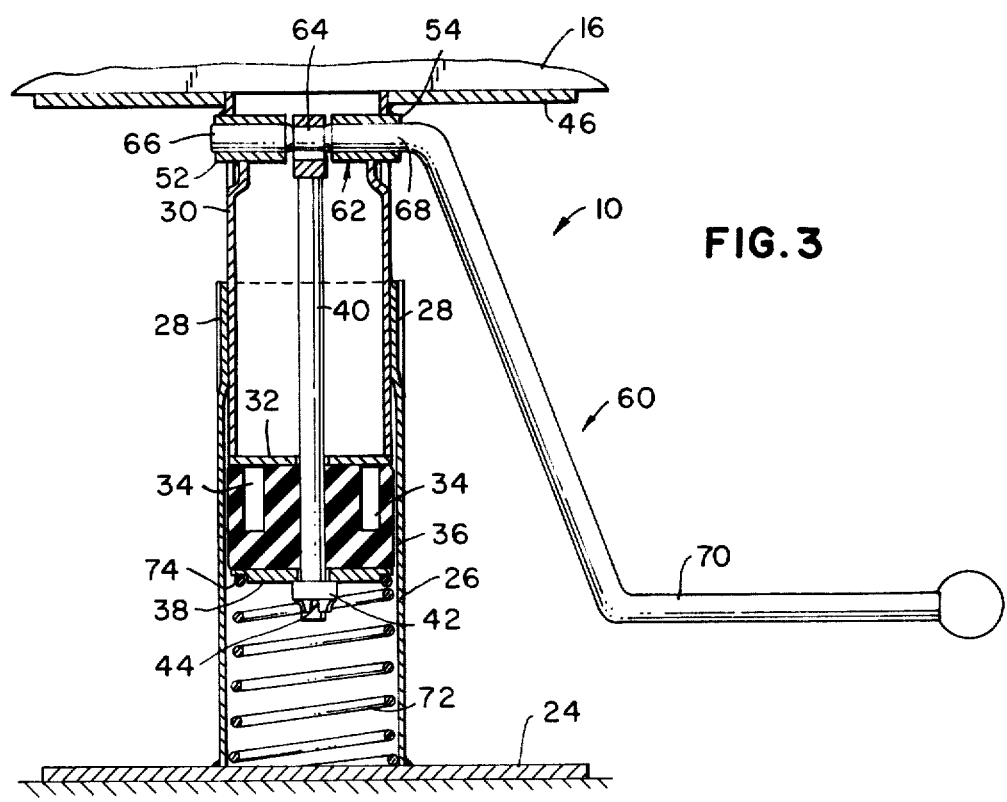
FIG. 3 is an elevational view similar to FIG. 2 illustrating the pedestal in the unlocked condition.

A second plate 38 is provided on the under side of cylindrical element 36. The plate 38 is not secured to the element 36. A rod 40 extends through central openings in plates 32, 38 and cylindrical element 36. The lower end of the rod 40 is threaded and a nut 42 is threadingly received thereon. The nut is locked in place by means of a cotter pin 44. The function of the nut 42 is to engage the plate 38 and press this plate against the cylindrical element 36 to cause element 36 to deform radially outwardly as shown in FIG. 2 and thus frictionally engage the inner surface of the tubular element 26 thus locking the elements 26, 30 together. The nut 42 may be adjusted to vary the applied pressure as needed. In the relaxed state, as shown in FIG. 3, the cylindrical element 36 is of smaller diameter than the inner diameter of tubular element 26 thus permitting swiveling of tubular element 30 and up and down movement of this element within tubular element 26.

The rod 40 extends upwardly and terminates adjacent the upper end of the tubular element 30. A seat support plate 46 is secured to the upper end of tubular element 30. The plate 46 is secured to the seat 16 to support same.

A ring 50 is provided on the upper end of rod 40. A pair of tibular segments 52, 54 are secured and extend through to indented portions 56, 58 of tubular element 30 as by welding. The segments 52, 54 are in alignment with the ring 50 when the ring is in the lowered position illustrated in FIG. 3 whereupon the cylindrical element 36 is in the relaxed state out of engagement with tubular element 26.

A crank 60 has a crank portion 62 which extends through segments 52, 54 and ring 50. As will be appreciated, the crank 60 is assembled with the segments 52, 54 before the segments are welded in place. The center section 64 of the crank portion 62 is offset radially outwardly from sections 66, 68 as may best be seen in FIG. 5. A crank arm 70 extends outwardly from the crank portion 62 for manual turning of the crank. When the crank is turned to the position illustrated in FIG. 3, the tubular element 30 may be raised or lowered or it may be rotated to permit adjustment of the seat to the position desired by the occupant. In one actual embodiment, a vertical adjustment of approximately three inches is possible. When the crank is turned to the position illustrated in FIG. 2, the nut 42 presses the plate 38 against cylindrical element 36 causing cylindrical element 36 to deform radially outwardly as shown in FIG. 2, thus engaging the tubular element 26 and fixing the position of the tubular element 30.

A coil spring 72 is provided within tubular element 26 beneath the plate 38. The plate 38 is provided with a peripheral notch 74 to receive the spring 72. The spring 72 aids in raising the seat. When it is desired to lower the seat, manual pressure must be applied thereto.

What I claim as my invention is:

1. A seat pedestal capable of supporting the weight of a person comprising an upstanding first tubular element, a second tubular element telescopingly received in the first tubular element for support of a seat, an elastomeric block within the first tubular element, said block being out of engagement with the inner surface of the first tubular element when the block is in a relaxed state, means securing said block to the second tubular element for movement therewith, said means for securing said block to the second tubular element for movement therewith comprising a first plate affixed to the lower end of said second tubular element, said first plate including downwardly extending pin elements extending into the block in securement therewith, a plurality of peripherally spaced apart inwardly extending ribs on the upper end of said first tubular element defining a bearing surface for said second tubular element, said first plate being of slightly greater diameter than said second tubular element whereby the peripheral edges of said second plate will contact said ribs upon extreme upward movement of said second tubular element to thereby prevent separation of the tubular elements, actuator means to compress the block in the direction of the longitudinal axis of the first tubular element with consequent radially outward expansion of the block to frictionally engage the inner surface of the first tubular element and releasably secure said tubular elements together to prevent relative movement therebetween, said actuator means being operable to release the block to permit relaxation thereof to thereby permit simultaneous vertical and rotative adjustment of the second tubular element with respect to the first tubular element, said actuator means including a second plate in abutment with the underside of said block, means to raise and lower said second plate for compression and relaxation of said block comprising a rod extending from said second plate and through said block and terminating at its upper end at a point adjacent the upper end of the second tubular element, crank means affixed to the upper portion of the second tubular element in engagement with the upper end of the rod to cause raising and lowering of the rod, said crank means comprising a crank arm extending exteriorally of the second tubular element for manual engagement, a ring-like element on the upper end of said rod, and an offset crank portion connected to the crank arm and located within said ring-like element for raising and lowering of the rod upon turning of the crank arm.

2. A seat pedestal as defined in claim 1, further characterized in that the lower end of the rod extends through said second plate and is threaded, a nut in threaded engagement with the lower end of the rod, said nut being adjustable on the lower end of the rod with respect to said plate.

3. A seat pedestal as defined in claim 1, further characterized in the provision of spring means within said first tubular element biasing the second tubular element upwardly to aid in raising the second tubular element for adjustment of the seat pedestal.

* * * * *